Nov. 10, 1953     R. D. RICHARDSON     2,658,384
GAS MEASURING DEVICE

Filed May 24, 1945     2 Sheets-Sheet 1

INVENTOR.
ROBERT D. RICHARDSON.
BY
Oltsch & Knoblock.
ATTORNEYS.

Nov. 10, 1953      R. D. RICHARDSON              2,658,384
                   GAS MEASURING DEVICE

Filed May 24, 1945                            2 Sheets-Sheet 2

INVENTOR.
ROBERT D. RICHARDSON.
BY Altsch + Kurolock.
ATTORNEYS.

Patented Nov. 10, 1953

2,658,384

UNITED STATES PATENT OFFICE 2,658,384

GAS MEASURING DEVICE

Robert D. Richardson, Michigan City, Ind., assignor to The Hays Corporation, Michigan City, Ind., a corporation of Indiana Application May 24, 1945, Serial No. 595,569

2 Claims. (Cl. 73—27)

This invention relates to a gas measuring device. More particularly it relates to a device for measuring the oxygen content of a gas.

The primary object of this invention is to provide a simple, accurate, sturdy and durable device for measuring oxygen.

A further object is to provide a practical device for determining the oxygen content of a gas by measuring the cooling effect of a movement of gas upon a heated wire positioned in a heterogeneous magnetic field.

A further object is to provide a device of this character which may be operated from either a direct current or a low frequency alternating current power supply.

A further object is to provide a device of this character having means for controlling the flow of gas in a predetermined pattern therein for measurement purposes.

A further object is to provide a device of this character having a novel thermal element of rugged construction.

A further object is to provide a device of this character having a novel, sturdy and thermally stable test cell.

A further object is to provide a device of this character having novel and simple means for effecting zero adjustment.

Other objects will be apparent from the description, drawings and appended claims.

It is known that molecular oxygen possesses paramagnetic properties of a higher order than all other gases excepting NO. Likewise it is known that the heat conductivity of a paramagnetic gas is reduced in a homogeneous magnetic field. The latter condition limits to only about 1% the total effect or change in thermal conductivity for the full range of oxygen to be measured, i. e., the range from 0 to 100% oxygen concentration in the gas sample. This effect is too small to be used as an accurate indication of the oxygen content of a gas in a practical gas measuring device of reasonable cost and with acceptable precision and sensitivity.

However, if a heated wire is positioned in a heterogeneous magnetic field, it is cooled when surrounded by a paramagnetic gas. The cooling action results from the flow of gas past the heating element. The paramagnetic gas adjacent to the heating element and heated thereby has a lesser magnetic susceptibility than its surroundings and consequently it tends to flow to an area of lesser flux density and is displaced in the magnetic field by cooler gas of greater magnetic susceptibility. This results in the flow of gas which has a cooling effect upon the heating element. The cooling effect due to the movement of the gas is opposite to the effect due to the thermal conductivity of the gas, but is much greater and therefore can be measured with greater accuracy by apparatus of lower cost than required for measuring thermal conductivity as mentioned above. The present invention utilizes this principle and reaction for the measurement of the oxygen content of a gas.

Figure 1:
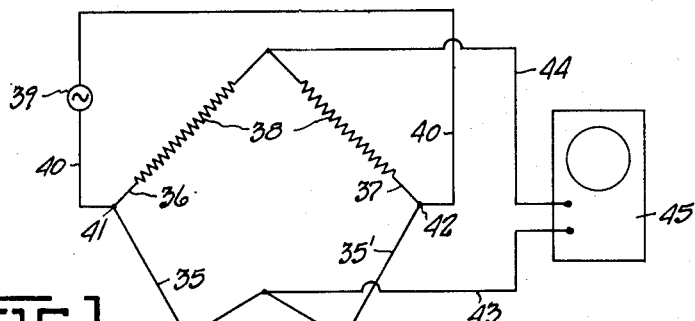
Fig. 1 is a vertical sectional view of the device, with parts illustrated diagrammatically.
Figure 2:
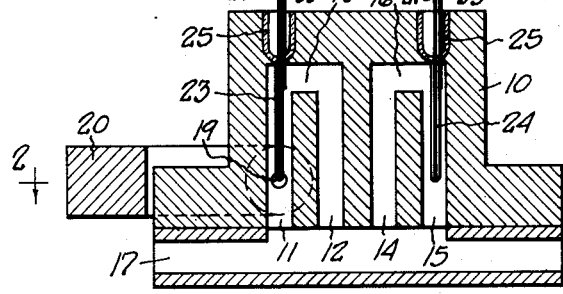
Fig. 2 is a transverse horizontal sectional view taken on line 2—2 of Fig. 1.

Referring to Figs. 1 to 4, the numeral 10 designates a test cell which preferably constitutes a block of brass or other non-ferrous material. The material of which cell 10 is constructed is preferably selected for its thermal stability and general ruggedness. The cell has a plurality of spaced parallel vertical passages therein, preferably arranged in line as shown in Fig. 2. Passages 11 and 12 are inter-connected at their upper ends by a longitudinal passage 13, and passages 14 and 15 are interconnected at their upper ends by a longitudinal passage 16. The lower end of each of the vertical passages 11, 12, 14 and 15 communicates with a horizontal gas flow passage 17. A pair of aligned and opposed inwardly tapering horizontal bores 18 are formed in cell 10 and communicate with passage 11 intermediate the height thereof. A pair of tapered iron pieces 19 fit within the bores 18 with their tips substantially flush with said passage. A C-shaped magnet 20 is adapted to embrace the cell 10 with its opposite pole portions so positioned adjacent to or in engagement with the pieces 19 as to magnetize them. The magnet 20 may be pivotally mounted upon any suitable support (not shown) by means of pivot studs 21.

Figure 3:
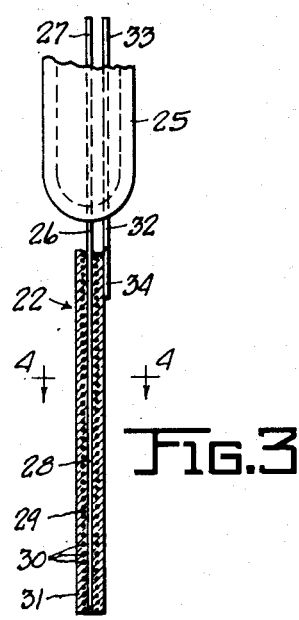
Fig. 3 is an enlarged side view of the heating element of the device.
Figure 4:
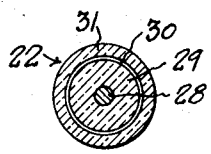
Fig. 4 is a still further enlarged transverse sectional view taken on line 4—4 of Fig. 3.

Two heating elements 22 are provided in the device. Element 23 constitutes a measuring element and is positioned in passage 11. Element 24 constitutes a comparison element and is positioned in the passage 15, although it can be positioned in passage 14 if desired. The construction of the two heating elements is the same and they have the same heating properties. The construction is best illustrated in Figs. 3 and 4. A support 25 is formed of electrical insulating material such as glass, and may be of cup shape as shown. Support 25 is mounted in a suitable opening in the block 10 in communication with the desired passage of the group of passages 11—15. A wire stem 26 extends longitudinally through the support 25 in which it is fixedly secured. The upper portion of stem 26 projects from the support to provide a terminal 27. The lower portion 28 of the stem 26 projects below the support 25 and supports a glass tube or sheath 29 which is melted in place therearound. A coil of wire 30 is wound around the tube 29. The entire unit is then glazed with the same type of glass used for tube 29 to provide an outer coat or sheath 31. A second wire stem 32 extends longitudinally through and is secured to support 25 in spaced relation to stem 26. The upper end of stem 32 projects above the support 25 to provide a terminal 33 and the lower end portion 34 of the stem is secured to the glazed coat 31 to cooperate with stem 26 to support the depending heater unit. The coil 30 is connected at its upper end to stem 32 and at its lower end to stem portion 28. The length of the depending heater portion of each element is preferably such that it lower end or tip is positioned at the level of the pole tips 19 of the magnet 20, the tip of element 23 terminating between magnet tips 19 in passage 11 as shown.

The terminals 27 and 33 of the two heater elements are connected in separate legs 35 and 35' of a Wheatstone bridge circuit whose remaining legs 36 and 37 have impedances or resistances 38 therein. The bridge circuit is connected to any desired source of power 39, which may be either direct current or alternating current, by leads 40 which are connected at points 41 and 42 between branches 35 and 36 and between branches 35' and 37, respectively. A lead 43 is connected to the bridge circuit between branches 35 and 35' and a lead 44 is connected to the bridge circuit between branches 36 and 37. A recorder 45, provided with an amplifier, or an indicator, is connected to the bridge circuit by leads 43 and 44.

In the operation of the device, passage 17 is connected by any suitable means (not shown) with the source of gas whose oxygen content is to be measured so that a continuous flow of sample gas is supplied to the device. The gas sample passes into the passage 11, and the oxygen content is attracted into the heterogeneous magnetic field in the space between the pole pieces 19 of magnet 20 by reason of its paramagnetic properties. At that point the gas is heated by the heating element 23, and the heated oxygen loses its attraction to the magnetic field. Consequently, the comparatively cold oxygen from passage 17 continually pushes the heated oxygen upwardly through the passage 11 and a net flow of gas is maintained. A free and unrestricted path for this flow of gas is provided by the passages 12 and 13, for return of the gas sample to passage 17. The comparison heating element 24 is positioned identically with relation to the gas sample in a branch flow path provided by passages 14, 15 and 16.

By virtue of the properties of oxygen in a magnetic field, i. e., the attraction of cold oxygen to a magnet and the loss of such attraction upon heating thereof, the rate of flow of gas in passage 11 and along the heating element 23 is greater than in the passage containing the comparison heating element 24. The increased gas flow serves to cool the heating element 23 somewhat. This changes the electrical value of the heating element 23 and unbalances the normally balanced bridge circuit to permit operation of the recorder 45 in direct proportion to the percentage of oxygen present in the gas sample. If there is no oxygen present in the system, there is still a flow of gas due to the thermal effect of the heating elements 23 and 24 thereon. However, this effect is balanced at the two elements 23 and 24. This general flow of gas reduces the time lag that would be necessary for direct diffusion.

The pivot mounting of the magnet so that it can be swung away from the members 19 accommodates quick and simple zero adjustment of the device. In other words, by swinging the magnet the members 19 are demagnetized, and the Wheatstone bridge and the recorder can be checked for bridge balance and zero setting by energizing the device, because the conditions at the measuring element 23 and at the comparison element 24 are then the same. The adjustments so made are not altered by the subsequent return of the magnet to position to re-magnetize members 19.

The use of a body 10 formed of brass or other thermally stable non-ferrous material, and the provision therein of the iron members 19 above described, are important features of the invention. Thermal stability and inherent ruggedness of strength result from the use of the brass block. Hence the device, and especially the test block, does not have to be handled under laboratory conditions, but can be used in a boiler room or at any location convenient to the apparatus to which the gas under test is derived. Danger of breakage is minimized, as are thermal fluctuations which would adversely affect reading. The passages in the block provide for a control of the pattern of gas flow for maximum efficiency and sensitivity and for avoidance of errors in the results recorded or indicated. Thus, control of the gas flow pattern facilitates accurate calibration of the instrument.

The construction of the heating elements is of critical importance because it permits operation of the device by direct current or by low frequency alternating current, for example, 60 cycle current. In either instance, the effect of the current in the magnetic field is neutral because the current passes through the coil 30 in one direction relative to the magnetic field and through the stem or wire 28 in the opposite direction relative to the field. The use of heating elements of the type common in thermal conductivity units could not be resorted to in a device requiring a magnetic field for its operation because of the effect of the field on the current unless a very high frequency of alternating current is used. The latter expedient would overcome this effect of the magnetic field but would have an inherent tendency to introduce vibration, particularly at a recorder or indicator which includes amplifying means, so that the accurate reading or operation of the recorder or indicator would be impossible. Likewise, use of a high frequency would require shielding, whereas ordinary conduit wiring can be used with this device. Other advantages of the heating element construction are that the elements are thermally stable because the thermal conductance common in single lead encased elements is materially reduced; that collection of moisture is less troublesome with this construction than with prior types of heating elements in thermal conductivity devices; that a glass can be selected whose thermal expansion exactly matches that of platinum of which the heating wires are formed; and that the heating element is strong and rugged. The construction of this heating element may be utilized for other types of thermal conductivity devices than that here illustrated and described.

Figure 5:
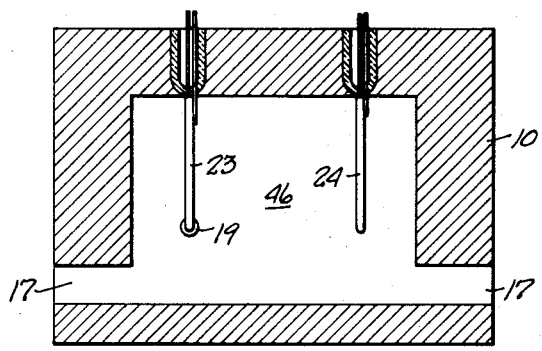
Fig. 5 is a vertical sectional view similar to Fig. 1, of a modified embodiment of the invention.

While the construction of the block with separate passages for the measuring element 23 and the comparison element 24 is preferred, it is not essential. Thus as shown in Fig. 5, the block 10 may be provided with one large opening or chamber 46 in communication with gas sample passage 17. The two heating elements 23 and 24 are arranged in spaced relation to each other and to the chamber walls to permit gas flow in eddy or convection currents within the chamber 46. This construction of the block lacks the positive mechanical control of gas flow patterns, but does not materially detract from the desired operation of the device, particularly in view of the convection flow effect which causes the oxygen drawn between the magnet pole pieces 19 to be displaced, when heated, in an upward direction along the heating element 23 to cool the same. Tests of a block of this construction have given practical readings of oxygen content.

Figure 6:
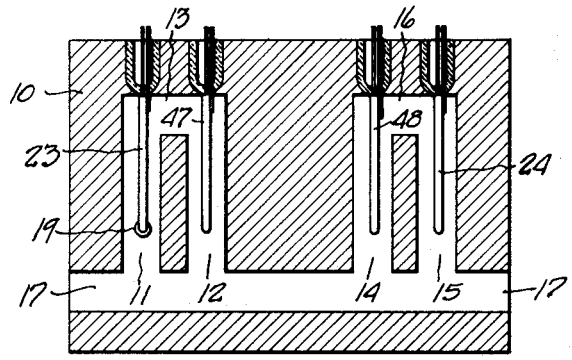
Fig. 6 is a vertical sectional view similar to Fig. 1, of another modified embodiment of the invention.

Another modification of the invention is illustrated in Fig. 6 and entails the use of a block 10 of the same construction as shown in Fig. 1, with the measuring element 23 and the comparison element 24 in passages 11 and 15, respectively. Two additional heating elements 47 and 48 are provided, being mounted in passages 12 and 14, respectively. These heating elements are connected in the bridge circuit in series relation with the other heating elements in the same flow path. That is, heating element 47 is connected in series with measuring element 23 in branch 35 of the Wheatstone bridge, and element 48 is connected in series with comparison element 24 in branch 35 of the bridge circuit. The cooling effect of the flow of gas, initiated by the magnet and measuring element 23, acts upon the element 47 also. This provides a cooling action at each of the elements 23 and 47 and therefore tends to provide increased sensitivity of the instrument.

Figure 7:
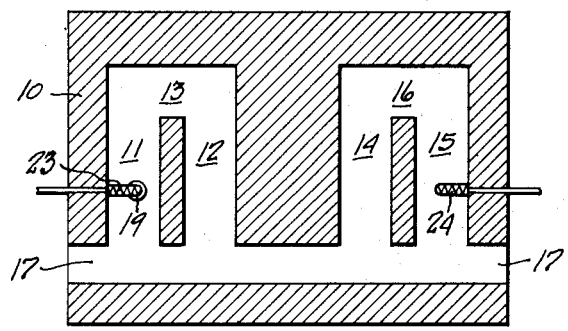
Fig. 7 is a vertical sectional view similar to Fig. 1, of another modified embodiment of the invention.

The construction illustrated in Fig. 7 utilizes a block 10 with passages similar to those in the block of Fig. 1. The heating elements 23 and 24 are positioned horizontally in the passages 11 and 15, instead of vertically. This construction operates on the same principle as the preferred embodiment, i. e. cooling of element 23 by flow of gas therearound incident to the loss of paramagnetic properties of oxygen when heated. The construction is not as convenient as the other constructions illustrated, but it is illustrative of the range of variations of the instrument which is possible.

I claim:

1. In a gas measuring device comprising a rigid test cell having a gas chamber and inlet and outlet passages, a magnet carried by said cell shaped to produce a heterogeneous magnetic field in a portion only of said chamber, said cell having passages communicating with said chamber, pole pieces for said magnet mounted in said passages, said magnet being pivoted to swing to and from said pole piece magnetizing position, a heating element projecting into said chamber with a portion thereof positioned fixedly in said magnetic field, a second heating element projecting into and positioned fixedly in said chamber remote from said field, and means for measuring the difference in temperature of said elements each heating element including a rigid insulation member and a pair of leads connected at one end and imbedded in spaced relation in said member, whereby current flows therethrough in opposite directions and the effect of said heating element in said magnetic field is neutral.

2. A test cell for use in a gas measuring device comprising a non-ferrous metal body of high thermal stability having a gas passage and a chamber communicating with said passage and off-set therefrom, said body having a pair of opposed inwardly tapered bores communicating with said chamber, a tapered magnetizable member in each bore, and a pivoted magnet normally embracing said body with its poles positioned adjacent to said members and adapted to normally magnetize said members.

ROBERT D. RICHARDSON.

References Cited in the file of this patent

UNITED STATES PATENTS

| Number | Name | Date |
|---|---|---|
| 1,860,544 | Krueger et al. | May 31, 1932 |
| 2,154,862 | Olshevsky | Apr. 18, 1939 |
| 2,255,551 | Willenborg | Sept. 9, 1941 |
| 2,269,850 | Hebler | Jan. 13, 1942 |
| 2,416,344 | Pauling | Feb. 25, 1947 |

FOREIGN PATENTS

| Number | Country | Date |
|---|---|---|
| 712,762 | Germany | Oct. 24, 1941 |
| 724,041 | Germany | Aug. 17, 1942 |
| 60,881 | Denmark | May 3, 1943 |
| 64,957 | Denmark | Oct. 28, 1946 |

OTHER REFERENCES

"Magnetic Phenomena," Williams (McGraw Hill), Chapter I.